United States Patent Office 3,777,022
Patented Dec. 4, 1973

3,777,022
DISINFECTANT COMPOSITION
Abraham Cantor, Elkins Park, Pa., and Murray W. Winicov, Flushing, N.Y., assignors to West Laboratories, Inc., Long Island City, N.Y.
No Drawing. Continuation of abandoned application Ser. No. 788,926, Jan. 3, 1969. This application June 28, 1971, Ser. No. 157,671
Int. Cl. A61l 1/00
U.S. Cl. 424—150                11 Claims

ABSTRACT OF THE DISCLOSURE

An iodine-phenol disinfectant composition of enhanced stability in both concentrate and aqueous use dilution form, said composition consisting essentially of 1 to 10% of a germicidal phenolic compound in which at least two, and preferably three, of the 2, 4 and 6 positions have substituents selected from the class consisting of halogen, nitro, phenyl, halogenated phenyl, benzyl, halogenated benzyl and halogenated hydroxy benzyl groups, and not more than one $C_1$ to $C_6$ alkyl or $C_3$ to $C_6$ cycloaliphatic group, and in which substituents not otherwise accounted for are selected from the class consisting of hydrogen, halogen and not more than one additional alkyl group, 2.5 to 35% of an ionic detergent providing about 1 to 10 parts per part by weight of phenolic, an amount of iodine within the range of about 0.25% to 5% by weight with the limitation that the amount of iodine does not exceed the weight of phenolic compound, an acid, optional with a trisubstituted phenol and essential with a disubstituted phenol, in an amount not exceeding about 40% by weight, and a diluent selected from the class consisting of solid diluents, aqueous alcoholic diluents providing not more than 25% alcohol and an amount of water in excess of the alcohol present, and water, if the only diluent, comprising at least 10% by weight of said composition.

---

This application is a continuation of Ser. No. 788,926, filed Jan. 3, 1969, now abandoned.

BACKGROUND OF THE INVENTION

Phenolic compounds have long been known and used as disinfectants, particularly for heavy-duty disinfecting operations. They are not very water soluble under essentially neutral conditions, and to form useful aqueous concentrate solutions they are generally combined with alkali to provide a pH of 11 or higher. One of the characteristics of phenolic disinfectants is that they are relatively slow-acting, although this is offset in part by their general stability and persistence.

Iodine, on the other hand, is a widely used disinfectant which is characterized by rapid biocidal action and relative instability in the presence of organic soil. In recent years, the stability of iodine disinfectants has been substantially increased by complexing with surface active agents and in particular with nonionic, cationic, and certain anionic detergents. Even such stabilized iodine compositions, however, do not have the long lasting biocidal action which characterizes phenolic disinfectants.

Attempts have been made to combine the rapid and long lasting biocidal activties above mentioned in iodine-phenol compositions, but heretofore such items have not met with commercial success due to instabilities which develop in concentrated products and/or use dilutions thereof. Such instabilities can take the form of physical instability, with one or more components separating, or chemical instability due to chemical reaction between components.

One example of such attempt to combine iodine with phenolic disinfectants is to be found in Canadian Pat. No. 729,597 (and corresponding Netherlands Pat. No. 6402842). This patent is broadly directed to "a disinfectant composition comprising a phenolic detergent and free iodine solubilized in an organic solvent and a surface active agent, an organic acid being present to maintain a low pH value, the composition representing a water emulsifiable concentrate."

The Canadian patent is a speculative and misleading disclosure. It lists almost a page of supposedly suitable phenolic compounds and indicates that a wide range of emulsifying agents, including both nonionic and anionic surface active agents, can be employed. It gives as examples six different formulations, without, however, providing any meaningful data to show that these formulations are either stable or germicidally effective.

Attempts to prepare products according to the examples of said Canadian patent have been unsuccessful in that the compositions lose iodine rapidly at use dilution, apparently through reaction with the phenolic component; and several of the compositions show objectionable iodine loss in the concentrate form. The monosubstituted phenols, which constitute about half of the phenols listed in the patent, are entirely unsuitable due to their rapid reaction with iodine. Nonionic surface active agents, although indicated in the patent to be satisfactory emulsifying agents, are entirely unacceptable due to their deactivation of the phenolic component.

Thus, the Canadian patent, in spite of its seemingly broad disclosure, provides no teaching of how to prepare iodine-phenol compositions having the type of stability and effectiveness which are required for practical commercial products.

THE INVENTION

It has been discovered that iodine-phenol compositions of enhanced and satisfactory stability in both the concentrate and use dilution form can be prepared by special selection of phenolic disinfectants and surface active agents and appropriate balancing of the proportion of components, particularly the ratio of surface active agent to the phenolic component.

Basically it has been found that in order to obtain stable compositions the phenol disinfectant must be at least disubstituted. More specifically, at least two, and preferably three, of the 2, 4 and 6 positions of the phenolic compound are substituted by halogen, nitro, phenyl, halogenated phenyl, benzyl, halogenated benzyl, or halogenated hydroxy benzyl groups or not more than one $C_1$ to $C_6$ alkyl or $C_3$ to $C_6$ cycloaliphatic group. Thee substituents not otherwise accounted for by the above are hydrogen, halogen, or not more than one additional alkyl group.

Suitable substituted phenols for use in accordance with the present invention include:

Disubstituted:
    2,4-dibromophenol
    2,6-dibromophenol
    2,4-dichlorophenol
    2,6-dichlorophenol
    4-chloro-2-iodophenol
    4-chloro-2-phenylphenol
    6-chloro-2-phenylphenol
    4-chloro-2-cyclopentylphenol
    2-benzyl-4-chlorophenol Trisubstituted:
    2,4,6-trichlorophenol
    2,4,6-tribromophenol
    2-benzyl-4,6-dichlorophenol Trisubstituted:
   2-methyl-4,6-dichlorophenol
   2-phenyl-4,6-dichlorophenol
   4-bromo-6-chloro-o-cresol
   4-bromo-2,6-dichlorophenol
   2,6-dibromo-4-methylphenol
   2,4-dibromo-6-nitrophenol
   2,6-diiodo-4-nitrophenol
Tetrasubstituted:
   4-methyl-2,3,6-trichlorophenol
   2,2'-methylenebis (3,4,6-trichlorophenol)

The amount of phenolic compound in the new compositions should be in the range of 1 to 10% and preferably about 3 to 7% by weight of the composition.

As surface active agent in the new compositions, non-ionic detergents are to be avoided due to their deactivation of the phenolic component; but ionic detergents generally can be employed including cationic, anionic and ampholytic detergents. Of these three subspecies, anionic detergents are much preferred; and anionic detergents which have been found particularly effective are: alkylbenzene sulfonates having 2 to 20 carbon atoms in the alkyl group(s), and sodium or potassium dodecyl diphenyl oxide disulfonate.

The amount of surface active agent can be in the range of 2.5 to 35% and preferably about 10 to 25% by weight of the composition. In selecting the amount of surface active agent, however, it should be noted that the proportion of surface active agent to phenolic should be in the range of about 1 to 10 parts, and preferably about 3 to 5 parts, surface active agent to each part by weight of phenolic.

The amount of iodine can be in the range of 0.25 to 5% by weight of compositions and preferably about 0.5 to 20%, of an alcoholic solvent such as isopropanol, the ranges above indicated the amount of phenolic component is substantially greater than the amount of iodine, and in general it is considered impractical to employ compositions in which the amount of iodine exceeds the amount of phenolic. The proportion of surface active agent to iodine is therefore quite high and ample to provide effective complexing or stabilizing of the iodine.

As is customary with phenolic disinfectants, composition may contain up to 25%, and preferably about 15 to 20%, of an alcoholic solvent such as isopropanol, the primary function of which is to aid in the solubilization of the constituents over a wide temperature range.

The presence of acid in the composition must be viewed from two different approaches. U.S. Pat. No. 2,977,315 teaches that acid is a desirable constituent of detergent-iodine compositions in "protecting" the iodine against organic soil and the alkalinity component of water hardness. However, it is well known that acid is not absolutely necessary for ordinary detergent-iodine compositions, and indeed, some formulators choose to limit or eliminate acid in certain deteregnt-iodine compositions. In the case of iodine-phenolic compositions when the phenolic is substituted in the 2, 4 and 6 positions, we have found that acid may or may not be incorporated, with almost the same reasoning as guided previous deteregnt-iodine art. However, when only two of the 2, 4 and 6 positions are occupied, we have found that acid is essential to preserve the iodine both in the composition itself and in aqueous dilutions.

Mineral acids such as hydrochloric acid, phosphoric acid and sodium acid sulfate can be employed, with phosphoric acid being preferred from the standpoint of its low cost and general acceptance in disinfecting compositions. The amount of acid can vary from about 5 to 40% by weight of the composition with 10 to 20% by weight being generally employed. In this connection, it is important that the amount of acid be such as to provide a pH below about 4 and preferably below 3 in the intended use dilution. Thus, it is contemplated that products with differing acid content might be marketed; i.e., one containing 10 to 20% acid for normally alkaline waters and one containing 30 to 40% acid for areas known to have highly alkaline waters. Alternatively a single product containing 10 to 20% acid could be marketed with instructions for the consumer to add acid in preparing use dilutions according to the alkalinity of the particular water available.

In preparing a liquid iodine-phenol composition, the iodine can be introduced in various ways. For example, elemental iodine can be dissolved in the alcohol component or in a mixture of the alcohol and surface active agent and then combined with the other components. Alternatively, iodine can be supplied in the form of a concentrated aqueous solution of iodine and HI in accordance with the teachings in U.S. Pat. No. 3,028,299. Such a solution can suitably contain about 57% $I_2$ and 20% HI.

In liquid preparations, the amount of water in the new compositions can vary from as little as about 10% to as much as about ⅔ of the total weight of the composition, depending on the potency or the biocidal activity desired and particularly upon the amount of acid which is present.

When an alcoholic solvent such as isopropanol, ethanol, or methanol is included, no more than about 25% should be used, and the amount of water in the preparation should be at least equal to the alcohol content in order to avoid an excessively low "flash point."

Solid powdered compositions should contain as little water as possible in order to enhance free-flowing properties. Diluents for solid products include water soluble substances such as sodium sulphate, sodium chloride, urea and sugar, as well as insoluble mild abrasives such as diatomaceous earth, bentonite, powdered silica, etc. The preferred mineral acid for solid powdered compositions is sodium acid sulphate.

In most instances, the liquid compositions will have the various components present in the proportions indicated in the following tabulation:

| Component | Percentage by weight |
|---|---|
| Phenolic compound | 3–7 |
| Surface active agent | 10–25 |
| Available iodine | 0.5–2 |
| Solvent | 15–20 |
| Acid | 10–20 |
| Water | 61.5–26 |

The concentration of individual components in a product to be marketed will depend in part on the dilution instructions to be used with the product. For example, for each 1% of active component at a recommended dilution rate of 1:100, one would have to provide 1.28% of such active component in a product intended to be diluted at the rate of one ounce per gallon in order to provide the same amount of such active component in the resulting use solutions.

In preparing use solutions of these iodine-phenol compositions, the product or concentrate is combined with water to provide a desired iodine level suitably in the range of about 50–150 p.p.m. of iodine. Thus, for example, a concentrate which contains 1% of iodine, if diluted with water in the proportion of 1:100, will provide approximately 100 p.p.m. of iodine. It is customary to relate the use dilution concentration to iodine content since it is the iodine which gives the prompt biocidal action. When a use dilution is prepared having appropriate activity in terms of iodine content, it will inherently have an appropriate amount of phenolic disinfectant to provide the delayed or persisting biocidal activity characteristic of the phenolic.

Use dilutions of these compositions can be prepared in substantial quantity and utilized from time to time throughout a day without appreciable loss in biocidal activity. In fact, even after 24 hours standing in closed containers, use dilutions generally maintain at least 60% of their initial activity. Iodine in use dilutions is characteristically less stable than in the concentrated product.

We have found that under certain conditions the biocidal activity in use dilutions is greater than can be obtained with either the iodine alone or the phenolic alone. In some cases the biocidal activity is greater than would be anticipated for the ordinary combined value of the iodine and phenolic components. There is a special utility in using our combinations of iodine with 2, 4, 6-di or trisubstituted phenolics in that both iodine and the phenolics have a limited aqueous solubility, and that combining the two can give a total biocide level which would be be unattainable by either one alone..

The following examples will serve to show the preparation and performance of typical iodine-phenol compositions in accordance with the present invention, but it is understood that these examples are given by way of illustration and not of limitation.

Example I

An iodine-phenol composition is prepared containing by weight:

| | Percent |
|---|---|
| Sodium salt of dodecylbenzene-sulfonic acid | 15 |
| HI-$I_2$ (57% $I_2$, 20% HI) | [1] 2.1 |
| 2,4,6-trichlorophenol | 5 |
| Phosphoric acid (75% active) | 10 |
| Isopropyl alcohol | 10 |
| Water, to 100%. | |

[1] Providing available iodine, 1.2%.

When this solution is diluted 1:200 with water it passes the AOAC Use Dilution Confirmation Test. AOAC (1965), pages 82–84 against *S. aureus, S. choleraesuis* and *P. aeruginosa*.

This composition I(a), and a second composition I(b), identical but for the omission of the phosphoric acid, are compared for relative stability under storage and use conditions.

When the concentrates are subjected to accelerated aging by storage in a 50° C. oven for 2 weeks, and then tested for available iodine the results are as follows:

| | Percent of— | | |
|---|---|---|---|
| | Initial $I_2M$ | Final $I_2$ | Loss |
| I(a) | 1.2 | 1.05 | 12.5 |
| I(b) | 1.2 | .95 | 20.8 |

This is indicative of very good stability. Similar compositions in which ortho phenylphenol is employed in place of the 2,4,6-trichlorophenol show an iodine loss under the same conditions of about 50% when phosphoric acid is present, and approximately 75% when the phosphoric acid is omitted.

A 1:100 dilution of compositions I(a) and I(b) in distilled water and in 100 p.p.m. AOAC hard water are stored in closed containers and tested from time to time for available iodine with the following results:

| Test sample | Iodine, p.p.m. | | | | |
|---|---|---|---|---|---|
| | Initial | 1 hr. | 3 hrs. | 6 hrs. | 24 hrs. |
| Distilled water: | | | | | |
| I(a) | 121 | 119 | 116 | 112 | 102 |
| I(b) | 109 | 104 | 100 | 99 | 89 |
| Hard water: | | | | | |
| I(a) | 110 | 104 | 99 | 95 | 87 |
| I(b) | 108 | 97 | 85 | 82 | 75 |

This data indicates that acidified formulas perform best in distilled or hard water, and that 2,4,6-trihalogen substituted phenol does not react excessively with germicidal amounts of iodine even in alkaline test water without acid in the formula. By contrast, non-acidified formulas containing similar amounts of disubstituted phenols and iodine, diluted similarly in 100 p.p.m. AOAC hard water, typically lose all their iodine in seconds.

Example II

A number of phenol-iodine solutions are prepared having the compositions indicated in the following tabulation wherein the different surface active agents (SAA) are identified as:

SAA-1 = linear ($C_{12}$) alkyl benzene sulfonate
SAA-2 = sodium salt of linear ($C_{12}$) alkyl benzene sulfonate
SAA-3 = linear ($C_8$) alkyl benzene sulfonate

| Component | Percent of— | | | | | |
|---|---|---|---|---|---|---|
| | II(a) | II(b) | II(c) | II(d) | II(e) | II(f) |
| 2,4,6-trichlorophenol | 5 | 5 | 5 | 5 | 5 | 6.4 |
| SAA-1 | | 15 | | 19.2 | 3.75 | 4.8 |
| SAA-2 | 15 | | 15 | | | |
| SAA-3 | | | | | 11.25 | 14.4 |
| HI-iodine (57% $I_2$) | 2.1 | 2.1 | 2.1 | 2.69 | 2.1 | 2.69 |
| Isopropyl alcohol | 15 | 15 | 20 | 19.2 | 20 | 19.2 |
| Phosphoric acid (75% active) | 10 | 10 | 10 | 12.8 | 10 | 12.8 |
| Sodium hydroxide (47%) | | 3.8 | | 4.9 | 3.8 | 4.9 |
| Water, up to | 100 | 100 | 100 | 100 | 100 | 100 |

Dilutions of iodine-phenol compositions have a tendency to be cloudy at intermediate dilutions in hard water, and in cold water. A comparison of clouding as a function of distilled water, 100 p.p.m. hard water, and temperature is given below.

| | Dilutions in distilled and 100 p.p.m. hard water at 20–25° C. (distilled/H.W.) | | | |
|---|---|---|---|---|
| | 1:25 | 1:50 | 1:100 | 1:200 |
| II(a), (b), (c), and (d) | Cloudy/cloudy | Clear/cloudy | Clear/cloudy | Clear/cloudy. |
| II(e) and (f)[1] | Clear/clear | Clear/clear | Clear/clear | Clear/clear. |

| | Dilutions in distilled and 100 p.p.m. Hard water at 5–10° C. (distilled/H.W.) | | | |
|---|---|---|---|---|
| II(a), (b), (c), and (d) | Cloudy/cloudy | Cloudy/cloudy | Clear/hazy | Clear/hazy. |
| II(e) and (f)[1] | Clear/clear | Clear/clear | Clear/clear | Clear/clear. |

[1] Dilution for II(f) was 1/32, 1/64, 1/128 and 1/256 to provide equivalent actives.

Samples II(e) and II(f), which contain predominately the $C_8$ alkyl benzene sulfonate, consistently show clearer dilutions under the test conditions. In fact, even in 200 p.p.m. hard water these samples provide generally clear dilution at room temperature and only slightly cloudy solutions at 5–10° C.

Example III

An iodine-phenol composition is prepared containing by weight:

| | Percent |
|---|---|
| Sod. salt of dodecylbenzenesulfonic acid | 20 |
| HI-I$_2$ (57% I$_2$) | 2.7 |
| 2,4,6-tribromophenol | 4 |
| Phosphoric acid (75%) | 15 |
| Water, to 100%. | |

This composition is equally effective at the 1:200 level as that of Example I against the organisms there described.

Example IV

An iodine-phenol composition is prepared containing by weight:

| | Percent |
|---|---|
| Sod. salt of dodecylbenzenesulfonic acid | 10 |
| HI-I$_2$ (57% I$_2$) | 1.4 |
| 2-methyl, 4,6-dichlorophenol | 3 |
| Phosphoric acid (75%) | 5 |
| Isopropyl alcohol | 10 |
| Water, to 100%. | |

When diluted 1:150 with water, this composition passes the AOAC Use Dilution Confirmation Test against *S. aureus, S. choleraesuis*, and *P. aeruginosa*.

Example V

An iodine-phenol composition is prepared containing by weight:

| | Percent |
|---|---|
| Sod. salt of dodecylbenzenesulfonic acid | 5 |
| Sod. salt of octylbenzenesulfonic acid | 15 |
| HI-iodine (57% I$_2$) | 2.7 |
| 2,4,6-trichlorophenol | 6.8 |
| Phosphoric acid (75%) | 12.8 |
| Isopropyl alcohol | 15 |
| Water, to 100%. | |

This example passes the UDCT against the three organisms named in Example I at 1:256 dilution, and has the added advantage of giving clear solutions in hard water (as high as 200 p.p.m. H.W.) solutions.

Example VI

An iodine-phenol composition (VI(a)) is prepared containing by weight:

| | Percent |
|---|---|
| Sod. salt of dodecylbenzenesulfonic acid | 19 |
| HI-I$_2$ (57% I$_2$) | 2.1 |
| 2-benzyl-4-chlorophenol | 5 |
| Isopropyl alcohol | 10 |
| Phosphoric acid (75% active) | 10 |
| Water, to 100%. | |

Two similar compositions are prepared: VI(b) containing no phosphoric acid, and VI(c) containing 20% phosphoric acid (75% active). These compositions show the following loss of iodine when subjected to 2 weeks' storage at 50° C.

| | | |
|---|---|---|
| VI(b) | No acid | 35% iodine loss. |
| VI(a) | 10% acid | 20% iodine loss. |
| VI(c) | 20% acid | <5% iodine loss. |

There is a distinct difference in stability, however, at use dilution, as indicated in the following tabulation based on 1:100 dilutions in distilled water and in 100 p.p.m. hard water.

| | | Iodine, p.p.m. of— | | | | | |
|---|---|---|---|---|---|---|---|
| | Acid content, percent | Distilled water | | | Hard water | | |
| Sample | | Initial | 6 hrs. | 24 hrs. | Initial | 6 hrs. | 24 hrs. |
| VI (b) | 0 | 102 | 36 | 11 | 0 | 0 | 0 |
| VI (a) | 10 | 111 | 79 | 54 | 115 | 77 | 51 |
| VI (c) | 20 | 120 | 120 | 116 | 120 | 118 | 118 |

This clearly shows the stabilizing effect of acid to reduce reaction between iodine and a 2,4-disubstituted phenol.

Example VII

A powdered phenol-iodine composition is prepared containing by weight:

| | Percent |
|---|---|
| Urea-iodine-HI powder containing 5% iodine, 2% HI and 92% urea | 20 |
| Spray-dried mixture of detergent and phenol containing 40% sodium salt of dodecylbenzenesulfonic acid, 8% sodium salt of 2,4,6-trichlorophenol, 52% sodium sulphate | 50 |
| Sodium acid sulphate | 30 |

A dilution of one gram of this composition in 200 ml. of water passes the Use Dilution Confirmation Test against *S. aureus, S. choleraesuis*, and *P. aeruginosa*.

If it is desired that the powdered composition have abrasive properties for heavy duty cleaning and sanitizing action, the sodium acid sulphate in the above formulation can be reduced to 20% by weight, and 10% by weight of diatomaceous earth added.

Example VIII

An iodine-phenol composition is prepared containing by weight:

| | Percent |
|---|---|
| Sod. salt of dodecylbenzenesulfonic acid | 20 |
| 4-chloro-2-cyclopentylphenol | 6.5 |
| HI-iodine (57% I$_2$) | 2.7 |
| Phosphoric acid (75%) | 25.6 |
| Isopropyl alcohol | 19.0 |
| Water, to 100%. | |

This composition passes the UDCT against the three organisms named in Example I at 1:256 dilution in distilled water or in 500 p.p.m. AOAC hard water. The available iodine content is 1.5% when made; after two week's storage at 50° centigrade, the available iodine content is 1.4%.

Various changes and modifications in the iodine-phenol compositions herein disclosed will occur to those skilled in the art, and to the extent that such changes and modifications are embraced by the appended claims, it is to be understood that they constitute part of the present invention.

What is claimed is:

1. An iodine-phenol disinfectant composition of enhanced stability in both concentrate and aqueous use dilution form consisting essentially of:
   (1) 1 to 10% of a phenolic disinfectant selected from the group consisting of 2,4,6-trichlorophenol; 2,4,6-tribromophenol; 2-methyl-4,6-dichlorphenyl; 2-benzyl-4-chlorophenol; and 4-chloro-2-cyclopentylphenol;
   (2) 2.5 to 25% of an alkylbenzene sulfonate detergent having 2 to 20 carbon atoms in the alkyl group in an amount of 1 to 10 parts by weight per part of phenolic compound;
   (3) an acidic compound selected from the group consisting of phosphoric acid, hydrochloric acid and sodium acid sulfate in an amount not exceeding 40% by weight;
   (4) 0.25 to 5% by weight of iodine not to exceed the weight of phenolic compound; and
   (5) a diluent compatible with said phenolic disinfectant compound selected from the group consisting of (a) aqueous alcoholic diluents providing not more than 25% alcohol and an amount of water in excess of the alcohol present, (b) water, said water comprising at least 10% by weight of said composition when used as the sole diluent, and (c) solids selected from the group consisting of sodium sulfate, sodium chloride, urea, sugar, diatomaceous earth, bentonite and powdered silica.

2. An iodine-phenol disinfectant composition as defined in claim 1, wherein the amount of phenolic compound is in the range of 3 to 7% by weight, the amount of detergent is in the range of 10 to 25%, and the amount of iodine is in the range of 0.5 to 2%.

3. An iodine-phenol disinfectant composition as defined in claim 2, wherein said acidic compound is present in the amount of about 10 to 20% by weight.

4. An iodine-phenol disinfectant composition as defined in claim 1, wherein the phenolic compound is 2,4,6-trichlorophenol.

5. An iodine-phenol disinfectant as defined in claim 1, wherein said phenolic compound is 4-chloro-2-cyclopentylphenol.

6. An iodine-phenol disinfectant composition as defined in claim 1, wherein said phenolic compound is 2-benzyl-4-chlorophenol.

7. An iodine-phenol disinfectant composition as defined in claim 1, wherein the diluent is a member selected from the group consisting of sodium sulphate, sodium chloride, urea and sugar and the acidic compound is sodium acid sulfate.

8. An iodine-phenol disinfectant composition as defined in claim 1 wherein said compatible diluent is water in an amount of at least 10% by weight of said composition.

9. An iodine-phenol disinfectant composition as defined in claim 1 wherein said compatible diluent is a mixture of water and alcohol, said alcohol being a member selected from the group consisting of isopropanol, ethanol and methanol.

10. An iodine-phenol disinfectant composition as defined in claim 9 wherein said alcohol is present in the amount of about 15 to 20% by weight.

11. An iodine-phenol disinfectant composition as defined in claim 9 wherein said composition contains about 15 to 20% by weight of isopropanol and about 10 to 20% of phosphoric acid.

References Cited

UNITED STATES PATENTS

| | | | |
|---|---|---|---|
| 2,977,278 | 3/1961 | Shelanski et al. | 252—106 X |
| 2,977,315 | 3/1961 | Scheib et al. | 252—106 |
| 3,301,752 | 1/1967 | Bubash | 424—150 |

FOREIGN PATENTS

| | | | |
|---|---|---|---|
| 963,305 | 7/1964 | Great Britain | 424—150 |
| 710,299 | 5/1965 | Canada | 424—150 |
| 729,597 | 3/1966 | Canada | 424—150 |

ALBERT T. MEYERS, Primary Examiner

N. A. DREZIN, Assistant Examiner

U.S. Cl. X.R.

424—128, 346, 347, 348